United States Patent
Chen et al.

(10) Patent No.: US 9,483,700 B1
(45) Date of Patent: Nov. 1, 2016

(54) SYSTEM AND METHOD FOR LANE VEHICLE LOCALIZATION WITH LANE MARKING DETECTION AND LIKELIHOOD SCORING

(71) Applicant: Honda Motor Co., Ltd., Tokyo (JP)

(72) Inventors: Yuncong Chen, San Diego, CA (US); Aniket Murarka, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/710,785

(22) Filed: May 13, 2015

(51) Int. Cl.
*G06K 9/00* (2006.01)
(52) U.S. Cl.
CPC .................................. *G06K 9/00798* (2013.01)
(58) Field of Classification Search
None
See application file for complete search history.

(56) References Cited

U.S. PATENT DOCUMENTS

| | | |
|---|---|---|
| 5,675,489 A | 10/1997 | Pomerleau |
| 6,819,779 B1 | 11/2004 | Nichani |
| 7,151,996 B2 | 12/2006 | Stein |
| 7,876,926 B2 | 1/2011 | Schwartz et al. |
| 8,204,277 B2 | 6/2012 | Zhang et al. |
| 2014/0032100 A1* | 1/2014 | Park ....................... G01C 21/30 701/446 |

FOREIGN PATENT DOCUMENTS

KR 101261409 5/2013

* cited by examiner

*Primary Examiner* — Atiba O Fitzpatrick
(74) *Attorney, Agent, or Firm* — Rankin, Hill & Clark LLP (57) ABSTRACT

A computer-implemented method and a system for vehicle localization. The method includes identifying expected lane lines based on a lane level map and a position of a vehicle and identifying observed lane lines based on images captured by an imaging device of the vehicle and the position of the vehicle. The method includes matching the expected lane lines to the observed lane lines and determining a likelihood score based on the matching. The method includes determining a best vehicle pose based on the likelihood score.

12 Claims, 4 Drawing Sheets

SYSTEM AND METHOD FOR LANE VEHICLE LOCALIZATION WITH LANE MARKING DETECTION AND LIKELIHOOD SCORING

BACKGROUND

Vehicle localization refers to constructing and updating a map of an unknown environment while simultaneously keeping track of a vehicle's location within the environment. To determine a precise position of the vehicle, several inputs can be fused together, for example, odometry information, vehicle sensor information, and stored lane level maps. Based on these inputs, a vehicle pose can be determined. However, the integrity of the input data as well as the environment around the vehicle (e.g., lane curves, lane changes) present challenges to determining a reliable and precise vehicle pose and localization of the vehicle within lanes.

BRIEF DESCRIPTION

According to one aspect, a computer-implemented method for vehicle localization includes identifying expected lane lines based on a lane level map and a position of a vehicle and identifying observed lane lines based on images captured by an imaging device of the vehicle and the position of the vehicle. The method includes matching the expected lane lines to the observed lane lines and determining a likelihood score based on the matching. Further, the method includes determining a best vehicle pose based on the likelihood score.

According to another aspect, a system for vehicle localization includes an odometry device for determining a position of a vehicle and a lane level map stored at a database. The lane level map can be based on the position of the vehicle. The system includes an imaging device for capturing images in an area around the vehicle based on the position of the vehicle. The system also includes a processor operatively coupled for computer communication to the odometry device, the database and the imaging device. The processor includes a motion module that retrieves expected data from the lane level map, the expected data identifying expected lane lines based on the position of the vehicle and determines a pose of a vehicle. The processor includes an observation module that retrieves observed data from the images, the observed data identifying observed lane lines based on the position and the pose of the vehicle. The processor also includes a matching module that matches the expected lane lines to the observed lane lines. Further, the processor includes a localization module that determines a likelihood score of the pose of the vehicle based on the matching and determines a best vehicle pose based on the likelihood score of the pose.

According to a further aspect, a non-transitory computer readable medium includes instructions that when executed by a processor perform a method for vehicle localization. The method includes identifying expected lane lines based on a lane level map and a position of a vehicle and identifying observed lane lines based on images captured by an imaging device of the vehicle and the position of the vehicle. The method includes matching the expected lane lines to the observed lane lines and determining a likelihood score based on the matching. The method also includes determining a best vehicle pose based on the likelihood score.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Figure 1:
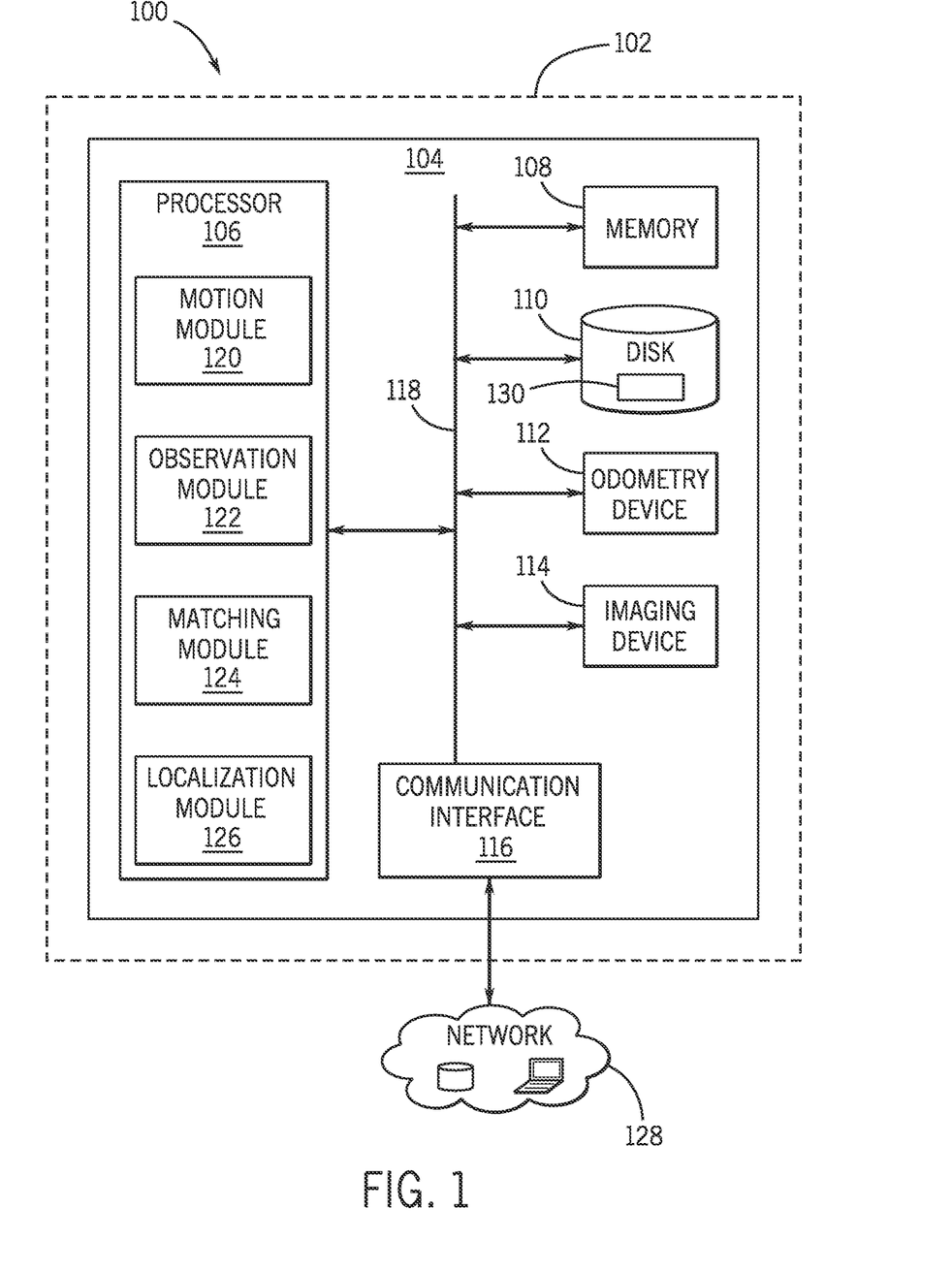
FIG. 1 is a block diagram of an exemplary system for lane vehicle localization with lane marking detection and likelihood scoring in accordance with one aspect.

Generally, the systems and methods disclosed herein provide localization and best pose selection using lane marking detection and likelihood scoring. Referring now to the drawings, where the showings are for purposes of illustrating one or more exemplary embodiments and not for purposes of limiting the same, FIG. 1 is a block diagram of an exemplary system 100 for lane vehicle localization with lane marking detection and likelihood scoring in accordance with one aspect. The components of the system 100, as well as the components of other systems, hardware architectures and software architectures discussed herein, may be combined, omitted or organized into different architecture for various embodiments. The system 100 and/or one or more components of the system 100, can in some embodiments, be implemented with a vehicle 102. Further, as will be discussed system 100 and/or one or more components of the system 100, can in some embodiments, be implemented with one or more vehicle systems and can communicate data in a connected vehicle system architecture.

In the illustrated embodiment of FIG. 1, the system 100 includes a computing device 104 with provisions for processing, communicating and interacting with various components of the system 100. Generally, the computer 140 includes a processor 106, a memory 108, a disk 110, an odometry device (e.g., a position determination unit) 112, an imaging device 114, and a communication interface 116 which are each operably connected for computer communication via a bus 118.

The computing device 104 may, in some embodiments, be integrated with or associated with an ECU and/or vehicle head unit (not shown). The communication interface 116 provides software and hardware to facilitate data input and output between the components of the computing device 104 and other components, networks and data sources, which will be described herein. Additionally, as will be discussed in further detail with the systems and the methods discussed herein, the processor 104 includes a motion module 120, an observation module 122, a matching module 124 and a localization module 126, each of which facilitate systems and methods for lane vehicle localization with lane marking detection and likelihood scoring.

The computing device 104 is also operatively connected for computer communication to a network 124. It is understood that the connection the network 124 in various ways, for example, through a network connection (e.g., wired or wireless) from the communication interface 116, a cellular data network from a portable device (not shown) connected to the computing device 104, a vehicle to vehicle ad-hoc network (not shown), an in-vehicle network, among others.

With reference again to the odometry device 112, the odometry device 112 includes hardware (e.g., sensors) and software to determine a position of the vehicle 102. For example, the odometry device 112 can include a GPS unit and/or an IMU unit. The imaging device 114 generally captures and provides images of an area and/or an environment around the vehicle 102, for example, images of the road, other vehicles, lane markings, among others. In one embodiment, the imaging device 114 is a monocular camera for providing one or more two-dimensional images. In other embodiments, the imaging device 122 can be one or more stereo cameras, three-dimensional cameras, remote sensing devices (e.g., LIDAR, lasers, sensors), other optical sensors, among others. Further, images can be in different formats other than two-dimensional images (e.g. stereo images, three-dimensional images). In some embodiments, the imaging device 114 can be mounted on the vehicle 102. In other embodiments, the imaging device 114 can be an external device (e.g., a road side device) that transmits images to the vehicle 102 via, for example, the network 124.

In the embodiment of FIG. 1, the system 100 also includes a lane level map 130. The lane level map 130 can include digital map data (pre-determined and/or pre-provided) as well as observed map data, collected, for example, by the odometry device 112 or the imaging device 114. The lane level map 130 can be stored in the disk 110 and/or the memory 116. In other embodiments, the lane level map 130 can be stored at the network 124 and can be provided by a third party.

II. Lane Marking Detection

The system 100 will now be described in more detail with respect to lane marking detection and matching. As mentioned above, the system 100 includes an odometry device 112 for determining a position of a vehicle 102. Further, the system includes a lane level map 130 stored at a database (e.g., the disk 110). The lane level map 130 can include digital map data of an area around the he current position of the vehicle 102 determined by the odometry device 112. For example, the lane level map can include information about the road (e.g., curves), lane markings, future, current and past positions and/or poses of the vehicle 102. The current position and/or pose of the vehicle 102 can be determined at least in part by the odometry device 112. Further, past positions and/or poses can be stored in the lane level map. Further, future (e.g., predicted) positions of the vehicle 102 can be based on the current position of the vehicle 102 and other measurements from other vehicle systems (not shown), for example, current speed. The system 100 also includes the imaging device 114 for capturing images in an area around the vehicle 102 based on the position of the vehicle. Further, the system 100, includes a processor 106 operatively coupled for computer communication to the odometry device 112, the database and the imaging device 114. Details of an exemplary operation of the system 100 will now be discussed in detail with regards to the modules included with the processor 106.

A. Expected Data

Figure 2A:
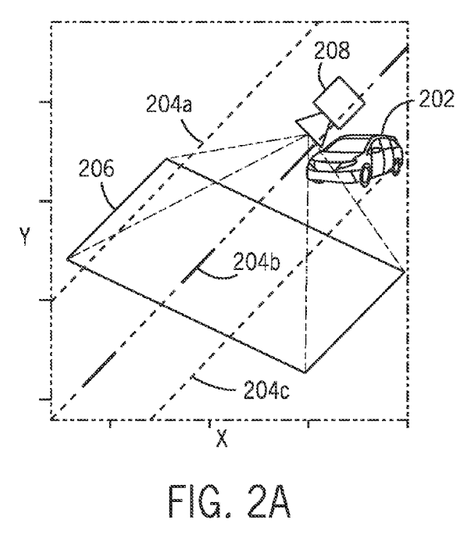
FIG. 2A is a schematic diagram of an exemplary vehicle and an exemplary lane map based on a position of the vehicle in accordance with one aspect.
Figure 2B:
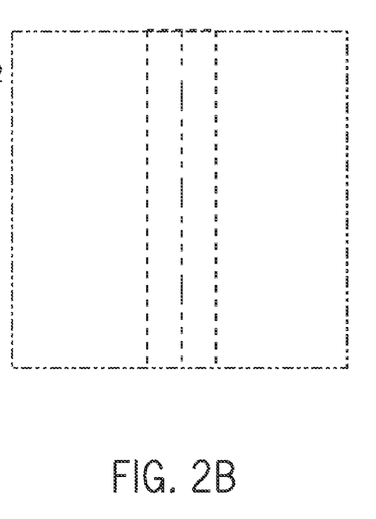
FIG. 2B is a schematic diagram of exemplary expected lane lines based on the lane map of FIG. 2A in accordance with one aspect.

In the illustrated embodiment of FIG. 1, the motion module 120 retrieves expected data from the lane level map 130. The expected data (e.g. observed data) identifies expected lane lines based on the position of the vehicle and can determine a pose of a vehicle. The position and/or pose of the vehicle can be based on information from the odometry device 112 and/or the imaging device 114. In one embodiment, standard particle filter localization and map matching based on the lane level map 130, position location derived from images captured by the imaging device 114, and speed data from one or more vehicle systems is used to determine possible past, current and future poses (not shown) of the vehicle 102. FIG. 2A illustrates a schematic diagram of an exemplary vehicle 202 and an exemplary lane level map based on a position of the vehicle in accordance with one aspect. The motion module 120, using information as described above, can identify lane lines 204a, 204b and 204c. Further, this information can be specific to an area of interest 206. This area of interest 206 can be captured by an imaging device, represented schematically in FIG. 2A as element 208. The motion module 120 identifies the expected lane lines shown in FIG. 2B based on the lane map of FIG. 2A. Thus, given a vehicle pose, and, for example using standard particle filter localization, FIG. 2B illustrates what a processed image identifying expected lane lines can look like. In some embodiments, the expected data as discussed above can be based on an observation model. The observation model can be described by the following expression:

$$P(o_t|x_t,m) \tag{1}$$

where $o_t$ is the current image at a given time t and $x_t$, m is a point on the lane level map at the given time t. Thus, each particle P can represent a potential vehicle pose.

B. Observed Data

Figure 3A:
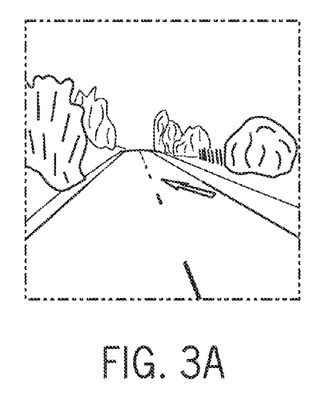
FIG. 3A is a schematic diagram of an exemplary image captured by an imaging device of the vehicle showing observed lane lines in accordance with one aspect.
Figure 3B:
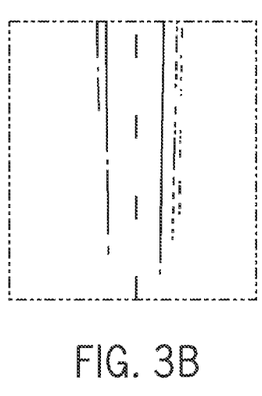
FIG. 3B is a schematic diagram of the image of FIG. 3A after application of an exemplary lane detection filter to the image in accordance with one aspect.
Figure 3C:
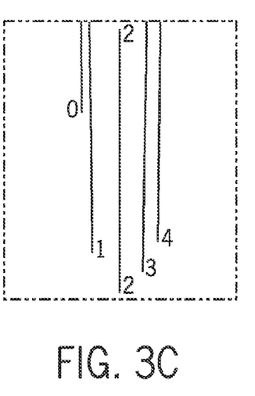
FIG. 3C is a schematic diagram of the image of FIG. 3B after application of an exemplary feature extraction transform identifying observed lane lines in accordance with one aspect.

For precise vehicle localization and lane marker detection the expected data can be fused with observed data. In particular, the observation module 122 retrieves observed data from the images captured by the imaging device 114. The observed data identifies observed lane lines based on the position and the pose of the vehicle 102. The position and pose of the vehicle 102 can be determined by the motion module 120 based on information from at least one of the odometry device 112 and/or the imaging device 114 as discussed above. Referring now to FIG. 3A, a schematic diagram of an exemplary image 302 captured by an imaging device of the vehicle illustrating observed lane lines in accordance with one aspect is shown. In one embodiment, the images are processed using a filter, for example, a top-hat filter. More specifically, a lane detection filter can be applied to the images. FIG. 3B is a schematic diagram of the image of FIG. 3A after application of an exemplary lane detection filter in accordance with one aspect. The images can be further processed for feature (e.g., lane markings) extraction using, for example, Hough line fitting. After filtering, the observation module 122 can identify the observed lane lines. FIG. 3C is a schematic diagram of the image of FIG. 3B after application of an exemplary feature extraction transform identifying observed lane lines in accordance with one aspect.

C. Lane Line Matching

Figure 4:
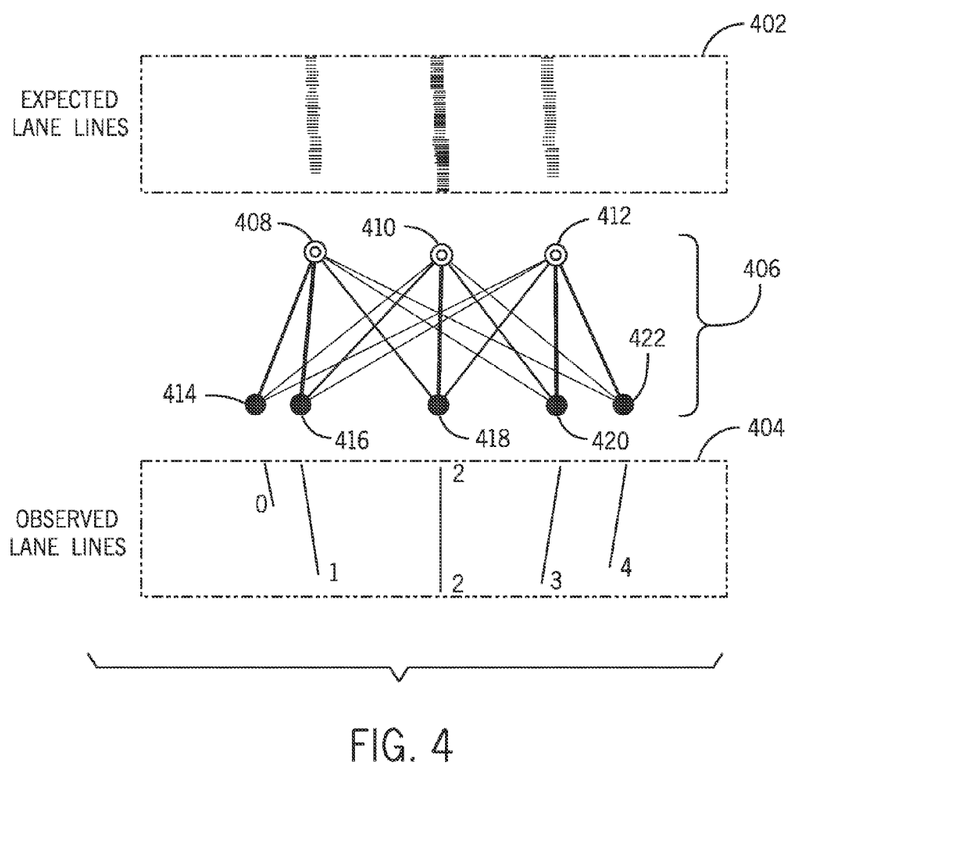
FIG. 4 is a schematic diagram of exemplary matching of the expected lane lines to the observed lane lines in accordance with one aspect.

The identified expected lane lines and the identified observed lane lines can be matched to determine a set of lane lines for vehicle localization and lane marking detection. For example, in one embodiment, the matching module 124 matches the expected lane lines to the observed lane lines. Specifically, the matching module 124 can determine one or more matched line pairs, each pair including an expected lane line matched to an observed lane line. FIG. 4 is a schematic diagram of exemplary matching of the expected lane lines to the observed lane lines in accordance with one aspect. In this example, the expected lane lines identified and shown in FIG. 2B are shown as element 402. The observed lane lines identified and shown in FIG. 3C are shown as element 404. In the embodiment of FIG. 4, Maximum Bipartite Matching is used for lane line matching and is shown schematically as element 406. The matching is based on based on end points of the expected lane lines 408, 410, 412 and the observed lane lines 414, 416, 418, 420 and 422. The lane line matching can be based on different constraints, for example, distances between end points, order of expected lane lines and observed lane lines, among others. It is appreciated that other matching methods can be used. For example, the image (e.g., the image shown in FIG. 3A) could be laid on top of an expected lane line image (e.g., the expected lane lines shown in FIG. 2B), and matching can be done based on a Chamfer matching using distance transforms based on the images.

Based on the matching, the matching module 124 can also determine a number of matched observed lane lines and a number of unmatched observed lane lines. As an illustrative example, five observed lane lines are identified and three expected lane lines are identified as discussed above. Based on the line matching, the matching module 124 matches three observed lane lines, resulting in three matched line pairs. Further, the matching module 124 determines out of five observed lane lines, since three observed lane lines were matched, two observed lane lines were not matched.

III. Likelihood Scoring and Localization

The matching process discussed above, in some cases, can be unreliable as lane lines could be inaccurate from blurry images resulting in some lane lines not being detected, lane lines may not be in a consistent order, and the lane lines may include outliers that are not detected. Accordingly, the localization module 126 determines a likelihood score of the pose of the vehicle 102 based on the matching. In one embodiment, the localization module 126 determines the likelihood score for each matched line pair based on a difference between the expected lane line and the observed lane line in the matched line pair. The difference can be a distance between an end point of the expected lane line and an end point of the observed lane line. In another embodiment, the difference is based on an angle between the expected lane line and the observed lane line. This difference is used to determine a likelihood score that the matched lane lines for a vehicle pose are accurate.

The likelihood score is a probability that the observed lane lines match given the expected lane lines can be determined by the following optimization expression:

$$P(\text{observed lines}|\text{expected lines}) = \Pi_{i \in matched} P(l_i|m_i) \cdot \Pi_{i \in unmatched} p_0 \quad (2)$$

where $l_i$ is the observed lane line matched to the expected lane line and $m_i$ is the expected lane line. Thus, $(l_i|m_i)$ can be a matched line pair. Further, $p_0$ denotes a probability of not detecting a line, which can be a predetermined probability. Moreover, $P(l_i|m_i)$ can be further demoted by a difference algorithm. The difference, in one embodiment, shown in equation 3, is based on a distance between the matched line pair and is denoted as:

$$P(l_i|m_i) = e^{-n \, d(l_i, m_i)} \quad (3)$$

where the exponential $e^{-n \, d(l_i, m_i)}$ is the distance between the line pair, for example, the distance between the end points of the line pair.

The probability value determined by equations (2) and (3) is used to determine a likelihood score. In one embodiment, the likelihood score is expressed as:

$$\text{Likelihood Score} = 1/m \, \log P(\text{observed lines}|\text{expected lines}) \quad (4)$$

The likelihood score can be assigned to each potential vehicle pose. Accordingly, in one embodiment, the localization module determines a best vehicle pose based on the likelihood score of the pose. For example, the likelihood score can be a numerical value that indicates the likelihood that the pose is correct or incorrect based on the line matching. The score could be as a percentage between 0% and 100% or a value in the range between 1 and 10, among others.

Figure 5:
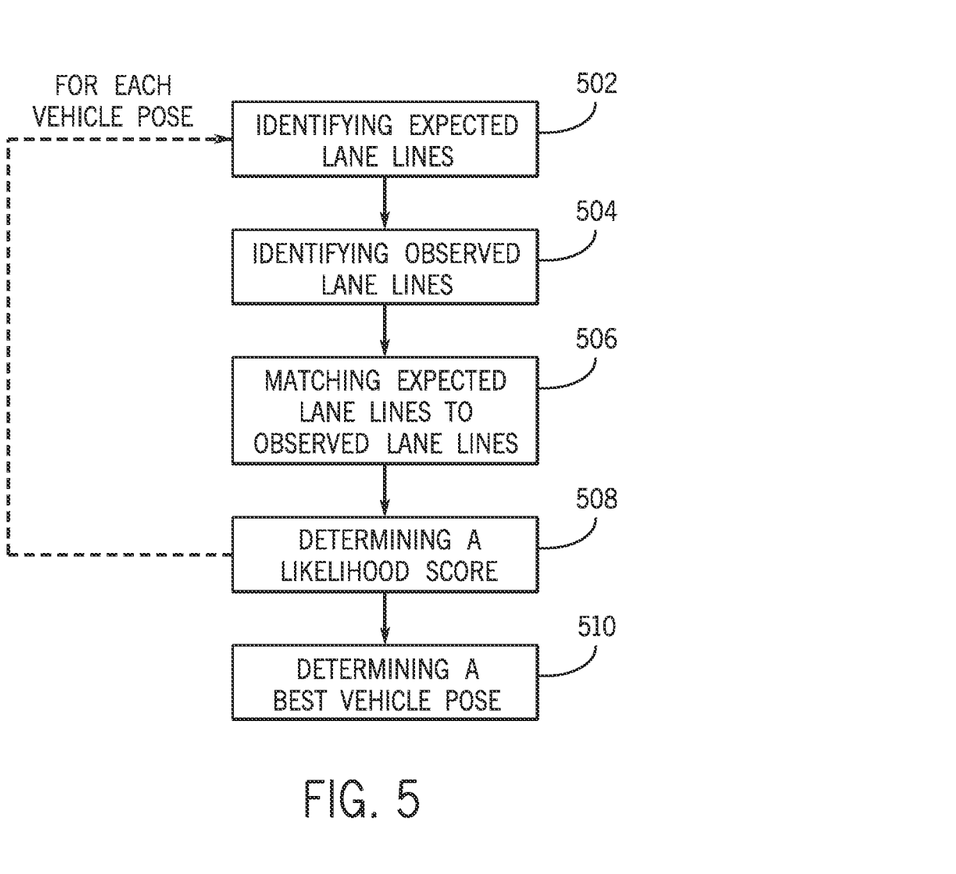
FIG. 5 is a process flow diagram of an exemplary method for lane vehicle localization with lane marking detection and likelihood scoring in accordance with one aspect.

IV. Methods for Lane Vehicle Localization with Lane Marking Detection and Likelihood Scoring The system 100 illustrated and described in FIGS. 1-4 above, will now be described with reference to a method of FIG. 5. It will be appreciated that the systems and components discussed above in FIGS. 1-4 may similarly be implemented with the method of FIG. 5. The method of FIG. 5 is a process flow diagram of an exemplary method for lane vehicle localization with lane marking detection and likelihood scoring in accordance with one aspect. At block 502, the method includes identifying expected lane lines based on a lane level map and a position of a vehicle. For example, as discussed above, the motion module 120 retrieves expected data from the lane level map 130. The expected data (e.g. observed data) identifies expected lane lines based on the position of the vehicle and can determine a pose of a vehicle.

At block 504, the method includes identifying observed lane lines based on images captured by an imaging device. Identifying the observed lane lines can include applying a lane detection filter to the images. For example, as discussed above, the observation module 122 retrieves observed data from the images captured by the imaging device 114. The observed data identifies observed lane lines based on the position and the pose of the vehicle 102. The position and pose of the vehicle 102 can be determined by the motion module 120 based on information from at least one of the odometry device 112 and/or the imaging device 114 as discussed above. Further, a lane detection filter (e.g., top hat filter, Hough line fitting) can be applied to the images.

At block 506, the method includes matching the expected lane lines to the observed lane lines. In one embodiment, matching the expected lane lines to the observed lane lines includes determining one or more matched line pairs, each pair including an expected lane line matched to an observed lane line. Further, matching the expected lane lines to the observed lane lines can include determining a number of matched observed lane lines. As discussed above, the matching module 124 can identifying the matched lane pairs by matching the expected lane lines to the observed lane lines using, for example, Maximum Bipartite Matching.

At block 508, the method includes determining a likelihood score based on the matching. In one embodiment, determining a likelihood score based on the matching includes determining a likelihood score for each matched line pair, the likelihood score based on a difference between the expected lane line and the observed lane line in the matched line pair. The difference can be based on a distance between an end point of the expected lane line and an end point of the observed lane line. In another embodiment, the difference is based on an angle between the expected lane line and the observed lane line. As discussed above with equations 2, 3 and 4, likelihood score is a probability that the observed lane lines match given the expected lane lines. Accordingly, the localization module 126 determines a likelihood score of the pose of the vehicle 102 based on the matching.

In one embodiment, determining a likelihood score based on the matching includes determining a number of unmatched observed lane lines. Accordingly, determining a likelihood score based on the matching includes determining a likelihood score based on a difference between the expected lane line and the observed lane line in the matched line pair and the number of unmatched observed lane lines. The difference between the expected lane line and the observed lane line in the matched line pair is shown in equation 3 above.

In one embodiment, the method can include retrieving one or more vehicle poses, and for each vehicle pose, determining the likelihood score for the vehicle pose and determining the best vehicle pose based on the likelihood score. Accordingly, at step 510, the method can include determining a best vehicle pose based on the likelihood score. As discussed above, the motion module 120 and/or the observation module 122 can determine one or more vehicle poses based on, for example, standard particle filter localization, using map matching based on the lane level map 130, position location derived from images captured by the imaging device 114, and speed data from one or more vehicle systems. For each pose, a likelihood score is determined at step 508 and assigned to the pose. The best pose can be selected based on the likelihood score of each pose. For example, the best pose could be the pose with the highest likelihood score. It is appreciated that in some embodiments, the likelihood scores for each pose or for a plurality of poses can be weighted or averaged to determine the best vehicle pose. Accordingly, expected data and observed data provide reliable vehicle localization to determine the best pose of a vehicle.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for vehicle localization, comprising:
    identifying expected lane lines based on a lane level map and a position of a vehicle;
    identifying observed lane lines based on images captured by an imaging device of the vehicle and the position of the vehicle;
    matching the expected lane lines to the observed lane lines, wherein matching the expected lane lines to the observed lane lines includes determining one or more matched line pairs, each pair including an expected lane line matched to an observed lane line, determining a number of matched observed lane lines, and determining a number of unmatched observed lane lines;
    determining a likelihood score based on the matching, wherein determining the likelihood score is based on a difference between the expected lane line and the observed lane line in each matched pair and the number of unmatched observer lane lines; and
    determining a best vehicle pose based on the likelihood score.

2. The computer-implemented method of claim 1, wherein identifying observed lane lines includes applying a lane detection filter to the images.

3. The computer-implemented method of claim 1, wherein the likelihood score is based on a difference between the expected lane line and the observed lane line in the matched line pair, wherein the difference is based on a distance between an end point of the expected lane line and an end point of the observed lane line.

4. The computer-implemented method of claim 1, wherein the likelihood score is based on a difference between the expected lane line and the observed lane line in the matched line pair, wherein the difference is based on an angle between the expected lane line and the observed lane line.

5. The computer-implemented method of claim 1, including retrieving one or more vehicle poses, and for each vehicle pose, determining the likelihood score for the vehicle pose and determining the best vehicle pose based on the likelihood score.

6. A system for vehicle localization, comprising:
    an odometry device for determining a position of a vehicle;
    a lane level map stored at a database, the lane level map based on the position of the vehicle;
    an imaging device for capturing images in an area around the vehicle based on the position of the vehicle; and
    a processor operatively coupled for computer communication to the odometry device, the database and the imaging device, the processor including,
        a motion module that retrieves expected data from the lane level map, the expected data identifying expected lane lines based on the position of the vehicle and determines a pose of a vehicle;
        an observation module that retrieves observed data from the images, the observed data identifying observed lane lines based on the position and the pose of the vehicle;
        a matching module that matches the expected lane lines to the observed lane lines and determines a number of matched observed lines and a number of unmatched observed lines; and
        a localization module that determines a likelihood score of the pose of the vehicle based on the matching, wherein the localization module determines the likelihood score based on the number of matched of observed lines and the number of unmatched observed lines, and the localization module determines a best vehicle pose based on the likelihood score of the pose.

7. The system of claim 6, wherein the matching module determines one or more matched line pairs, each pair including an expected lane line matched to an observed lane line.

8. The system of claim 7, wherein the localization module determines the likelihood score for each matched line pair based on a difference between the expected lane line and the observed lane line in the matched line pair.

9. The system of claim 8, wherein the localization module determines the difference as a distance between an end point of the expected lane line and an end point of the observed lane line.

10. A non-transitory computer readable medium comprising instructions that when executed by a processor perform a method for vehicle localization, comprising:
- identifying expected lane lines based on a lane level map and a position of a vehicle;
- identifying observed lane lines based on images captured by an imaging device of the vehicle and the position of the vehicle;
- matching the expected lane lines to the observed lane lines, wherein matching the expected lane lines to the observed lane lines includes determining one or more matched line pairs, each pair including an expected lane line matched to an observed lane line, and
- determining a number of unmatched observed lane lines;
- determining a likelihood score for each of the one or more matched line pairs based on a difference between the expected lane line and the observed lane line in each matched pair and the number of unmatched observer lane lines; and
- determining a best vehicle pose based on the likelihood score.

11. The non-transitory computer readable medium of claim 10, wherein the difference is based on a distance between an end point of the expected lane line and an end point of the observed lane line.

12. The non-transitory computer readable medium of claim 11, including retrieving one or more vehicle poses, and for each vehicle pose, determining the likelihood score for the vehicle pose and determining the best vehicle pose based on the likelihood score.

\* \* \* \* \*